United States Patent [19]

Nelson et al.

[11] Patent Number: 5,207,279
[45] Date of Patent: May 4, 1993

[54] AGRICULTURAL APPARATUS HAVING VERTICALLY ADJUSTABLE DISC GANG ASSEMBLIES

[75] Inventors: Marvin L. Nelson, Downers Grove; Jimmy R. Kreftmeyer, Minooka, both of Ill.

[73] Assignee: Case Corporation, Racine, Wis.

[21] Appl. No.: 841,372

[22] Filed: Feb. 25, 1992

[51] Int. Cl.⁵ .............................................. A01B 35/18
[52] U.S. Cl. .................................. 172/140; 172/178; 172/180; 172/454; 172/583
[58] Field of Search ............... 172/140, 142, 145, 146, 172/148, 149, 174, 175, 178, 180, 193, 194, 195, 452, 454, 455, 478, 479, 583, 654, 656, 705, 707, 741, 776

[56] References Cited

U.S. PATENT DOCUMENTS

| | | | |
|---|---|---|---|
| 2,138,904 | 12/1938 | Carswell | 172/146 X |
| 3,091,299 | 5/1963 | Truelove | 172/776 X |
| 3,225,839 | 12/1965 | Petit | 172/142 X |
| 4,050,524 | 9/1977 | Hake | 172/707 |
| 4,180,005 | 12/1979 | Zumbahlen | 172/142 X |
| 4,250,970 | 2/1981 | Pfenninger et al. | 172/178 X |
| 4,321,971 | 3/1982 | Hake et al. | 172/710 |
| 4,446,924 | 5/1984 | Dietrich, Sr. | 172/140 |
| 4,479,549 | 10/1984 | Fegley | 172/142 |
| 4,625,809 | 12/1986 | Moynihan | 172/178 |

OTHER PUBLICATIONS

Noble "Mix-N-Till" Sales Brochure, Jan. 1983.
Noble "Harro-All II Seedbed Finisher," Sales Brochure, Jan. 1989.
Kovar "The Clod Father" Sales Brochure, Jan. 1981.
Kent Manufacturing Company, tri-fold Brochure (undated) and entitled "Constant Level Series V Disc-O-Vator" (6 pages).

Primary Examiner—Dennis L. Taylor
Assistant Examiner—Jeffrey L. Thompson
Attorney, Agent, or Firm—Rudnick & Wolfe

[57] ABSTRACT

An agricultural apparatus having a combination of ground engaging tools thereon. The agricultural apparatus includes a plurality of ground engaging cultivator tools mounted on a frame assembly which is specifically configured to promote accurate lateral spacing of the cultivator tools thereon. The agricultural apparatus further includes a pair of disc gang assemblies arranged on opposite lateral sides of the longitudinal centerline of the implement and a lift mechanism for conjointly elevating and positioning the disc gang assemblies relative to the frame assembly. The frame assembly is comprised of a series of interconnected frame members including laterally extending tool bars. Each cultivator tool is adjustably secured to a respective tool bar by a resiliently biased bracket assembly. To facilitate lateral adjustment of the cultivating tools, the tool bars are fixedly connected in spaced relation to other frame members. The spacing between the tool bars and other frame members allows the tool carrying bracket assembly to fit therebetween thus facilitating lateral spacing of the tools relative to each other.

2 Claims, 5 Drawing Sheets

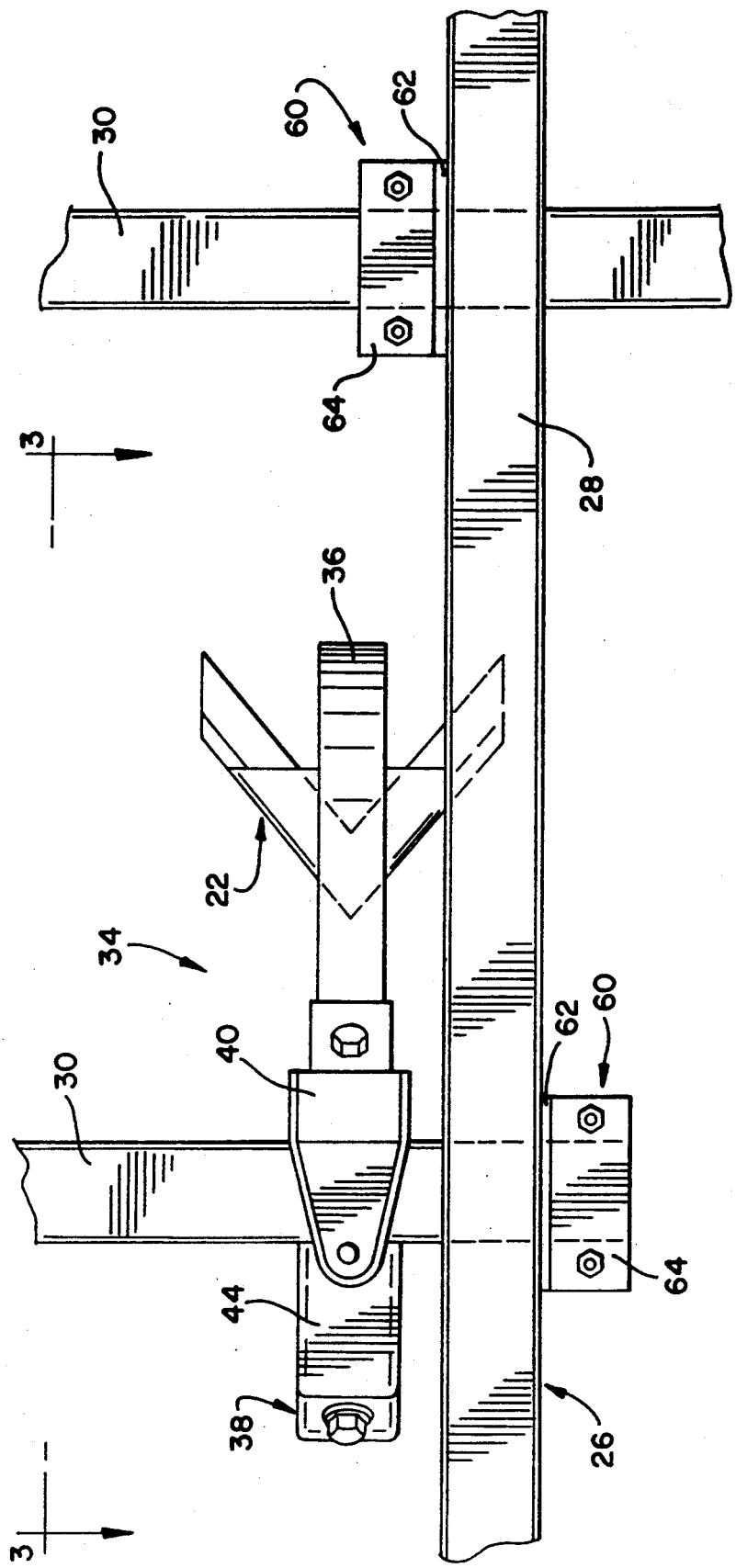

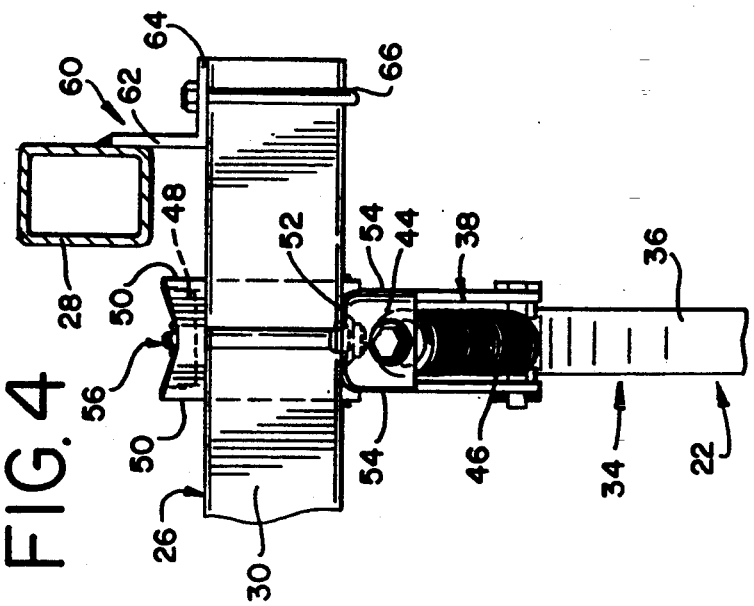
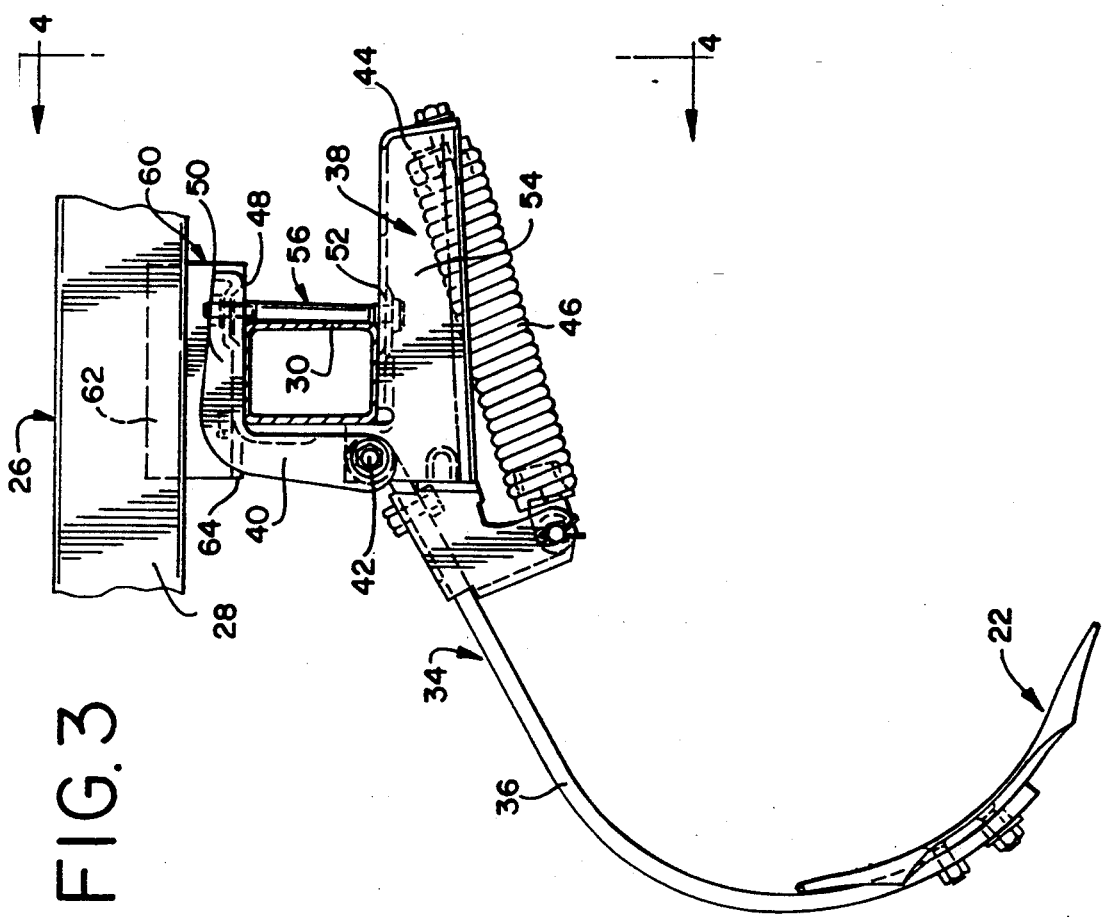

AGRICULTURAL APPARATUS HAVING VERTICALLY ADJUSTABLE DISC GANG ASSEMBLIES

FIELD OF THE INVENTION

The present invention generally relates to farm implements of the general type including a frame assembly having at least one pair of disc gang assemblies at a forward end thereof followed by several rows of earth working tools mounted on laterally extending tool bars. More specifically, the present invention relates to an agricultural apparatus capable of elevationally and conjointly positioning the pair of gang assemblies and laterally adjusting the earth working tools along the entire length of a respective tool bar.

BACKGROUND OF THE INVENTION

To lessen the number of times that a field must be worked, farm implements have been devised with a wheeled frame assembly adapted to arrange a combination of agricultural tools thereon. Larger farm implements are typically equipped with at least one pair of disc gang assemblies at a forward end of the implement for mixing residue materials into the field or ground. Each disc gang assembly is mounted for general vertical movement relative to the frame assembly. Rearwardly of the disc gang assemblies, in the direction of implement movement, are several lateral rows of tillage or cultivating tools arranged at forward, median, and rear positions.

The ability to vertically move the disc gang assemblies facilitates transportation of the farm implement and affords control over field penetration. The elevation of each disc gang assembly is hydraulically controlled through independent mechanisms. The mechanism for controlling elevation of each disc gang assembly has a hydraulic driver connected to a power source and to independent linkage assemblies thus resulting in a duplicative and a relatively complex arrangement of parts.

The tillage or cultivating tools are arranged in fore-and-aft spaced lateral rows on the frame assembly. To allow for changing field or planting patterns and for other reasons, the tools in any row are laterally adjustable relative to each other. On a typical farm implement, the tools are individually and precisely secured to a plurality of laterally extending tool bars forming part of the frame assembly. Proximate an intersecting location thereof, each tool bar is welded or otherwise affixed to rearwardly extending arms likewise forming part of the frame assembly.

In general, each cultivating tool is designed to resiliently deflect upon encountering an obstruction such as a rock, root, or the like thereby reducing the likelihood of damage to the tool. In this regard, a tool mounting structure including a clamp-like mechanism affixes a shank portion of each tool to a respective tool bar on the frame assembly. The clamp-like mechanism of each tool mounting structure surrounds the tool bar and usually includes a single bolt for adjustably and/or releasably securing the tool mounting structure relative to the tool bar. A typical tool mounting structure further includes a spring arrangement which allows for resilient deflection of the tool.

Providing sufficient strength and rigidity to the tool mounting structure has required a relatively wide clamp mechanism. It is further desirous to protect the spring arrangement on the tool mounting structure by widening portions of the clamp mechanism forming part of the tool mounting structure. As will be appreciated, lateral adjustment of the tools along the length of each tool bar is restricted and limited in those areas where the tool bar and arms of the frame assembly intersect. That is, the relatively wide clamp mechanism of some tool mounting structures abut against the rearwardly extending arms of the frame assembly and inhibit precise positioning and placement of the cultivating tools along the length of the tool bars. Thus, the tool mounting structure is required to be mounted on a tool bar but to one side or the other of the rearwardly extending adjacent arm of the implement frame assembly. The problem of adjusting the tool mounting structure along the length of each tool bar is also problematical in and about the wheels which support the frame assembly for movement across the field.

Thus, there is a need and a desire for a farm implement including a frame apparatus capable of mounting a combination of tools such as disc gang assemblies and cultivating tools thereon and in a manner simplifying elevation of the disc gang assemblies while likewise allowing for convenient and proper lateral placement of the cultivating tools.

SUMMARY OF THE INVENTION

In view of the above, and in accordance with the present invention, there is provided an agricultural apparatus having a combination of ground engaging tools mounted thereon. The agricultural apparatus includes a plurality of ground engaging cultivator tools mounted on a frame assembly which is specifically configured to promote accurate lateral spacing of the cultivator tools thereon. The agricultural apparatus of the present invention further includes a pair of disc gang assemblies arranged on opposite lateral sides of the longitudinal centerline of the frame assembly and a lift mechanism for conjointly elevating and positioning the disc gang assemblies relative to the frame assembly.

The frame assembly is supported at a rear end by wheels and is adapted to be towed across the field during operation. The frame assembly is comprised of a series of interconnected frame members. In a preferred form, the frame assembly includes at least two laterally spaced frame members or arms and a series of fore-and-aft spaced frame members or tool bars to which the cultivator tools are secured in laterally extending row formations. The laterally spaced arms of the frame assembly extend rearwardly from a hitch provided at a forward end of a frame assembly. Each tool bar is secured to an arm proximate an area where the tool bar and arms cross each other.

Each cultivating tool is adjustably secured to a respective tool bar by a resiliently biased bracket assembly. Each bracket assembly includes upper and lower clamp members arranged on opposite sides of the tool bar and which are interconnected by a releasable fastener so as to allow adjustment of the bracket assembly and thereby the cultivating tool along the length of the tool bar. The bracket assembly pivotally connects a shank of each cultivating tool to the frame assembly.

To facilitate adjustment of the cultivating tools, each tool bar and arm are fixedly connected in spaced relation relative to each other. The spacing between the tool bars and arms allows the bracket assembly of each cultivating tool to fit therebetween thus facilitating lateral spacings of the cultivator tools relative to each other and adjacent the wheels by providing the entire length of each tool bar to be available for securement of a bracket assembly of a cultivating tool thereto.

In a most preferred form of the invention, an L-shaped bracket has a first leg connected to an arm of the frame assembly and a second leg connected to a tool bar. The L-shaped bracket fixes the tool bar and arm in vertically spaced relation relative to each other and provides an opening therebetween which is sufficiently sized to allow the upper clamp member of a cultivating tool bracket assembly to fit therebetween. The ability to move the bracket assembly between the frame members of the frame assembly allows each cultivating tool to be positioned anywhere along the entire length of each tool bar.

Another aspect of the present invention relates to the disc gang lift assembly provided on the frame assembly of the agricultural frame apparatus. A preferred form of lift assembly includes a rock shaft having a fixed and laterally extended axis of rotation extending generally parallel to the tool bars of the frame assembly and over each side of the longitudinal centerline of the frame assembly. A series of crank arms radially extend from the rock shaft and are connected to the pairs of disc gang assemblies. A driver is provided for rotating the rock shaft about the axis thereby conjointly elevating and positioning the disc gang assemblies arranged on opposite sides of the centerline of the frame assembly.

In a preferred form of the invention, each disc gang assembly includes a laterally elongated carrier which mounts a plurality of ground engaging discs for rotation about a fixed axis. Each disc gang assembly carrier is connected for vertical movement relative to the frame assembly by at least two pivotal arms connected at a forward end of the frame assembly. The crank arms on the rock shaft are arranged in pairs on opposite sides of the longitudinal centerline of the frame assembly with each pair being connected to the elongated carrier of a respective disc gang assembly.

The present invention facilitates adjustment of the cultivating tools along the entire length of the tool bars and allows for accurate lateral spacing of the tools relative to each other including those tools arranged in the wheel area of the frame assembly. The use of a single driver for elevating and positioning a pair of disc gang assemblies arranged on opposite sides of the frame assembly reduces the number of parts for the frame assembly and simplifies hydraulic operation of the lift assembly.

Numerous other features and advantages of the present invention will become readily apparent from the following detailed description, the accompanying drawings, and the appended claims.

BRIEF DESCRIPTION OF THE DRAWINGS

FIG. 2 is an enlarged fragmentary top plan view of a tool mounting apparatus with a ground engaging tool connected to a frame of the agricultural apparatus;

FIG. 3 is a fragmentary side elevational of the tool mounting apparatus and ground engaging tool illustrated in FIG. 2;

FIG. 4 is a fragmentary front elevational view taken along line 4—4 of FIG. 3;

DETAILED DESCRIPTION OF THE PRESENT INVENTION

Figure 1:
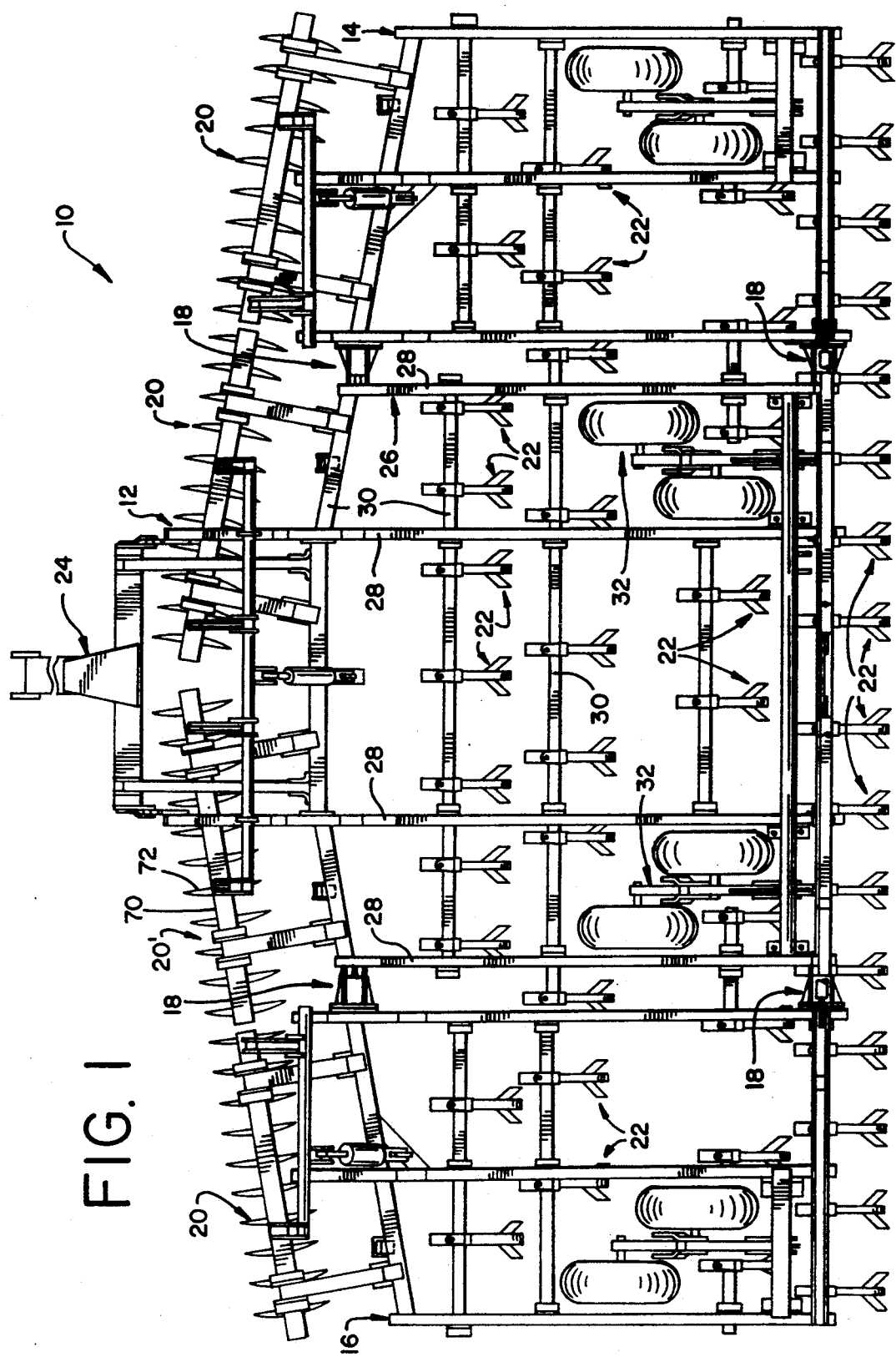
FIG. 1 is a top plan view of an agricultural apparatus in accordance with the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, a multi-sectional and foldable farm implement is generally designated by reference numeral 10 in FIG. 1. The farm implement 10 comprises a wheeled center section 12 and wheeled wing sections 14 and 16 disposed on opposite lateral sides of and connected to center section 12.

Each wing section 14, 16 is connected to the center section 12 through suitable hinge structure 18 allowing for overcenter elevational movement of the respective wing sections 14, 16 relative to the center section 12. To minimize the lateral width of the implement when the wing sections are vertically elevated into a raised position, the hinge structure 18 is preferably of the type disclosed in copending and co-assigned U.S. patent application Ser. No. 07/825,956, filed Jan. 27, 1992, the full teachings of which are incorporated herein by reference.

Each section 12, 14 and 16 of the implement 10 preferably carries a combination of earth working tools thereon. In the illustrated embodiment, each section of the implement is provided at a forward end thereof with a vertically movable disc gang assembly 20 for mixing residue materials into the field or ground as the implement moves thereover. Notably, the center or main section 12 of the implement has two laterally adjacent disc gang assemblies 20 and 20' mounted thereon on opposite sides of the longitudinal centerline of section 12 in a manner discussed in detail hereinafter. Rearwardly of each disc gang assembly, in the direction of movement of the implement 10, each section of the implement is equipped with several lateral rows of tillage or cultivating tools 22.

With the exception of the double disc gang assembly 20, 20' and a hitch mechanism 24 being provided at a forward end of section 12, each section comprising the implement 10 is substantially similar in construction. Therefore, only the main or center section 12 will be described in detail with the understanding that sections 14 and 16 are of substantially similar construction.

Each section of implement 10 includes a horizontally disposed frame 26 adapted for movement over a field. Frame 26 is comprised of a series of rigidly interconnected frame members including at least two elongated fore-and-aft extending arms 28 which are joined to each other by a series of laterally extending frame members 30. In the illustrated embodiment, the majority of the frame members 30 are configured as tool bars. In a most preferred form of the invention, each of the frame members 28 and 30 has a generally square and tubular cross-sectional configuration. Each section of implement 10 further includes at least one conventional wheel assembly 32 provided between the arms 28 and toward a rear end of frame 26.

To add versatility to the implement, the tools 22 on each frame section of the implement are laterally movable relative to each other to accommodate different row spacings therebetween. Because the implement 10 traverses a relatively wide swath as it is drawn across the field, especially when both wing sections 14 and 16 are operated in combination with the center section 12, the lateral spacing between the tools 22 must be precise such that proper positioning of one tool will not adversely affect proper and effective operation of other tools in the row of tools.

As shown in FIGS. 2 and 3, each cultivator tool 22 depends from and is preferably connected to the frame 26 through a mounting apparatus 34. In the illustrated embodiment, mounting apparatus 34 includes a shank 36 having the cultivator tool 22 attached at one end thereof. Shank 36 is pivotally connected at an opposite end to a resiliently biased bracket assembly 38. Bracket assembly 38 is a conventional design which includes an inverted L-shaped upper clamping member 40 having one leg thereof pivotally connected by a pivot pin 42 to a lower clamping member 44. Bracket assembly 38 further includes biasing means 46 preferably in the form of a tension spring connected at one end to clamping member 44 and connected at the other end to the shank 36. As will be understood, spring 46 resiliently and continually urges the cultivator tool 22 downwardly toward the ground.

The L-shaped upper clamping member 40 preferably has a channel shaped cross-sectional configuration including a substantially flat web or back portion 48 with upwardly extending side walls 50 adding strength and rigidity to member 40. Lower clamping member 44 is configured with an inverted U-shaped cross-sectional profile including a substantially flat web 52 with depending side walls 54 which partially protect the biasing means 46 while simultaneously adding strength and rigidity to clamping member 44. The opening defined between web 48 of clamping member 40 and web 52 of clamping member 44 allows a lengthwise portion of a respective tool bar 30 to pass therebetween. As shown, a releasable fastener assembly 56 including a bolt and nut operate in combination with clamping members 40 and 44 to releasably secure the bracket assembly 38 in a laterally adjusted position along the length of a respective tool bar.

To promote precise lateral placement of the tools 22 relative to each other, the present invention structures the frame 26 of each section 12, 14, and 16 such that the bracket assembly 38 for each cultivator tool can be releasably secured substantially anywhere along the entire length of a respective tool bar 30.

In the illustrated embodiment, each tool bar 30 is connected in vertically spaced relation to a fore-and-aft extending arm 28 as with an L-shaped mounting assembly 60 which can alternatively be secured to either inner or outer side surfaces of a respective arm 28 of frame 26. As shown, mounting assembly 60 includes an upstruck leg 62 and a generally horizontal leg 64. The upstruck leg 62 is suitably fastened, as by welding or the like, to either side of an arm 28 of frame 26 and depends therefrom. A tool bar 30 is suitably fastened as by means of a U-bolt or the like 66 to the under side of leg 64.

By such structure, each tool bar 30 is rigidly secured or fastened to an arm 28 of frame 26 in such a manner that a vertical opening or space is provided at the intersection of each arm 28 and tool bar 30. The vertical opening or space between the arm 28 and frame member 30 is sized to allow clamping member 40 of bracket assembly 38 to fit therebetween thereby facilitating lateral spacings of the cultivator tools 22 relative to each other by providing the entire length of each tool bar to be available for securement of a bracket assembly of a cultivating tool thereto.

Figure 5:
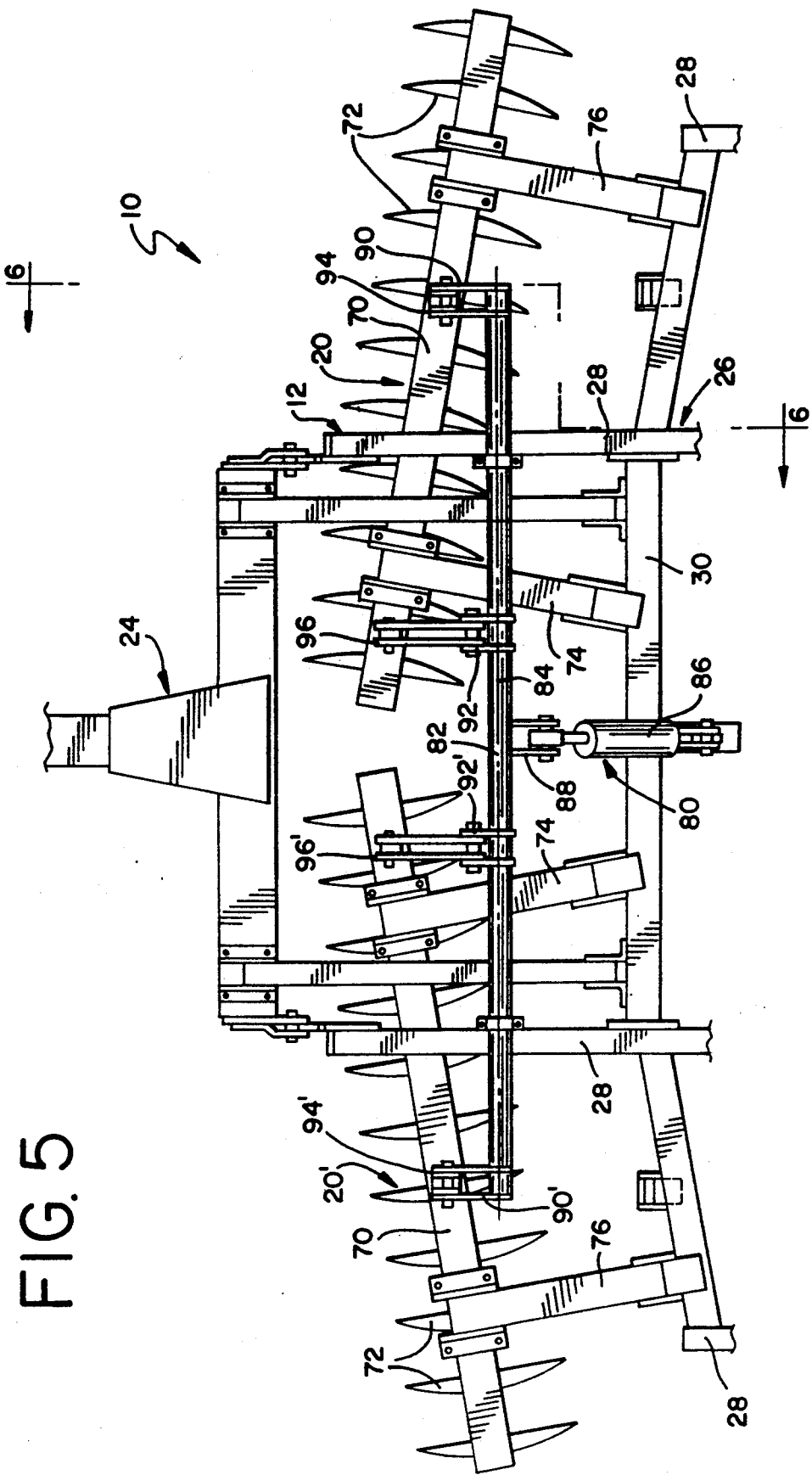
FIG. 5 is an enlarged fragmentary top plan view of a forward end of the agricultural apparatus illustrated in FIG. 1.

In addition to being similar in structure to each other, each disc gang assembly 20 has a conventional well known design. Suffice it to say, and as shown in FIGS. 5 and each disc gang assembly 20 comprises a frame including an elongated generally rectangular and hollow beam 70 to which a series of ground engaging discs 72 are rotatably secured. As shown in FIG. 5, the disc assemblies 20 and 20' are arranged on opposite lateral sides of the longitudinal centerline of the implement 10 and slant in opposite angular directions extending rearwardly and away from the hitch mechanism 24. Such arrangement allows the discs 72 on respective gang assemblies 20 and 20' to move residue material toward the center of the implement rather than outwardly and away therefrom.

Each disc assembly 20 is mounted for elevational movement relative to a respective section of the implement. In the illustrated embodiment, a pair of substantially identical laterally spaced arms 74 and 76 connect a respective disc assembly to a frame respective section of the implement. Arms 74 and 76 extend parallel to each other and away from a lateral frame member 30 of a respective section to which the disc assembly is to be connected. A first end of each arm 74, 76 is articulately connected to the section of the implement while a second end of each arm is articulately connected to a top surface of the elongated beam 70 of the respective disc gang assembly.

To reduce the number of parts on the implement 10, a disc gang lifting assembly 80 is provided for conjointly elevating and positioning the disc gang assemblies 20 and 20' relative to the main or center section 12 of the implement 10. In the preferred embodiment, the disc gang lifting mechanism 80 includes an elongated rock shaft 82 supported in a conventional manner from frame 26 for oscillatory rocking movement about a fixed axis 84. Notably, the rocking axis 84 of shaft 82 is angularly offset from the angular orientation of the disc gang assemblies 20 and 20'. A driver 86, preferably in the form of a double-acting hydraulic cylinder, is provided to forcibly rock shaft 82 about its fixed axis 84 in response to selective operation by the operator.

Figure 6:
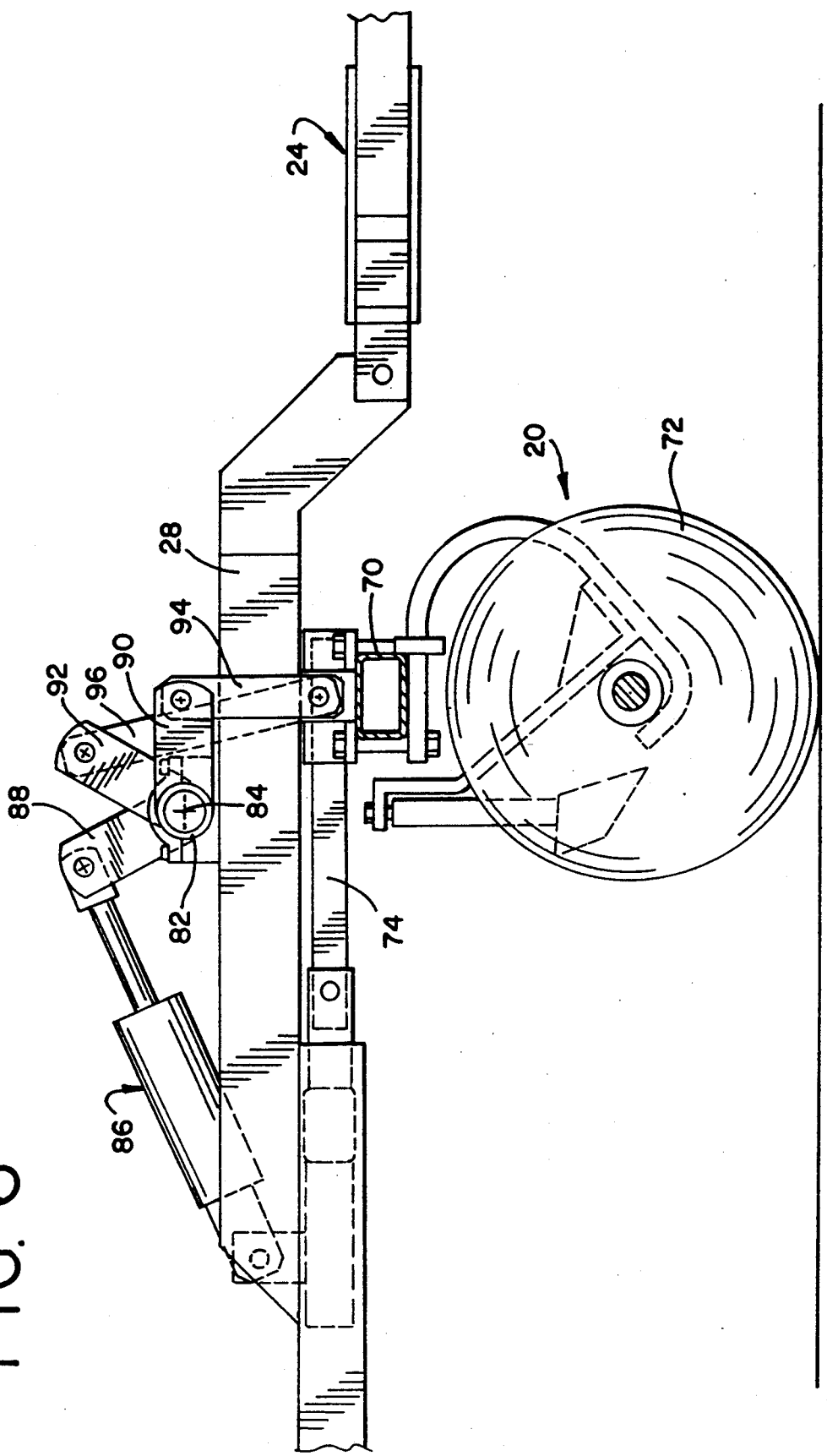
FIG. 6 is a fragmentary enlarged side elevational view taken along line 6—6 of FIG. 5.

As shown in FIGS. 5 and 6, rock shaft 82 has a centrally located crank arm 88 which radially extends from shaft 82 and an additional two pairs of crank arms including crank arms 90, 92 and 90',92' which radially extend from shaft 82 and are arranged on opposite lateral sides of crank arm 88. It is important to note, however, that the crank arms 90, 92 and 90', 92' of respective pairs of crank arms are angularly offset from each other as well as being angularly offset from crank arm 88.

One end of driver 86 is connected to crank arm 88 at a location radially spaced from the axis 84 about which rock shaft 82 moves. An opposite end of driver 86 is connected to the center or main section 12 of the implement such that extension/retraction of the driver 86 will result in rocking movement of shaft 82 about axis 84.

Lift links 94, 96 are connected to the free ends of crank arms 90, 92, respectively, at a location radially spaced from the axis 84 of shaft 82. The opposite end of each lift link 94, 96 is articulately connected to the elongated beam 70 of disc gang assembly 20. Similarly, lift links 94', 96' are connected to the free ends of crank arms 90', 92', respectively, at a location radially spaced from the axis 84 of shaft 82. The opposite ends of links 94', 96' are articulately connected to the elongated beam of disc assembly 20'.

While the implement sections have been described as being provided with cultivator sweeps or tools, it should be apparent that other agricultural implements can alternatively be connected to the frame 24 of each implement section through an apparatus similar to mounting apparatus 34 discussed above. A salient feature of the present invention being that the frame members 30 which carry the pivotal mounting apparatus 34 for each tool are rigidly joined to other frame members 28 of the implement section such that an adequately sized opening is defined therebetween. The vertical spacing between the rigidly joined frame members 28 and 30 allows the upper clamp member 40 of each bracket assembly 38 to fit therebetween thus facilitating proper lateral positioning of the tools relative to each other by providing the entire length of each tool bar 30 to be available for securement of a bracket assembly of a ground engaging tool thereto. Providing the entire length of each tool bar for securement of a bracket assembly further promotes proper positioning of the tools in the area of the wheel assemblies 32.

The lifting mechanism 80 is provided to promote substantially simultaneous elevation and positioning of the disc gang assemblies 20 and 20' relative to each other. The rotational movement imparted to the rock shaft 84 through use of a single driver 86 is transmuted to simultaneous elevational movement and positioning of the disc gang assemblies 20 and 20' relative to the frame 26 of the implement. Thus, the lifting mechanism 80 reduces the number of parts required to elevate and position dual gang assemblies arranged on opposite sides of a centerline of the frame, is simple in construction and, thus, economical in manufacture and operation.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An agricultural frame apparatus comprising:
   a wheeled frame assembly adapted to be towed across a field, said frame assembly including at least two laterally spaced arms extending generally parallel to each other on opposite sides of the longitudinal centerline of and rearwardly from a hitch mechanism provided at a forward end of the frame assembly, and a series of laterally extending fore-and-aft spaced tool bars connected to each arm;
   a plurality of agricultural ground engaging tools mounted to said tool bars to form generally lateral rows of ground engaging tools;
   a first disc gang assembly connected toward a front end of and for generally vertical movement relative to the frame assembly, said first disc gang assembly being connected on one side of a longitudinal centerline of the frame assembly such that the assembly extends rearwardly and angularly away from the hitch mechanism;
   a second disc gang assembly connected toward the front end of and for generally vertical movement relative to the frame assembly, said second disc assembly being connected on a second side of the longitudinal centerline of the frame assembly such that the assembly extends rearwardly and angularly away from the hitch mechanism;
   disc gang assembly lifting assembly including a rock shaft extending generally parallel to said tool bars and having a fixed lateral axis of rotation extending to each side of the longitudinal centerline of the frame assembly, a plurality of crank arms extending radially from said rock shaft in angularly offset relation relative to each other and connected to said first and second disc gang assemblies, and a driver connected to one of said crank arms for rotating said shaft about said axis thereby conjointly elevating and positioning the first and second disc gang assembly relative to the frame assembly.

2. The agricultural frame apparatus according to claim 1 wherein each disc gang assembly includes a laterally elongated carrier which mounts a plurality of ground engaging discs for rotation about a fixed axis and which is connected for vertical movement relative to said frame assembly by at least two pivotal arms connected to said frame assembly.

* * * * *